(12) United States Patent
Miyata

(10) Patent No.: US 8,482,500 B2
(45) Date of Patent: Jul. 9, 2013

(54) DISPLAY APPARATUS

(75) Inventor: Kazuhiko Miyata, Habikino (JP)

(73) Assignee: Sharp Kabushiki Kaisha, Osaka (JP)

( * ) Notice: Subject to any disclaimer, the term of this patent is extended or adjusted under 35 U.S.C. 154(b) by 538 days.

(21) Appl. No.: 12/758,136

(22) Filed: Apr. 12, 2010

(65) Prior Publication Data

US 2010/0198599 A1 Aug. 5, 2010

Related U.S. Application Data

(62) Division of application No. 10/597,201, filed as application No. PCT/JP2004/019573 on Dec. 27, 2004, now Pat. No. 7,728,826.

(30) Foreign Application Priority Data

Jan. 16, 2004 (JP) .................................. 2004-009844

(51) Int. Cl.
*G10L 13/00* (2006.01)
*G09G 3/36* (2006.01)

(52) U.S. Cl.
USPC .......................................... 345/87; 345/204

(58) Field of Classification Search
USPC ........................ 345/87, 98, 100, 204, 156–183
See application file for complete search history.

(56) References Cited

U.S. PATENT DOCUMENTS

| 5,206,634 | A | 4/1993 | Matsumoto et al. |
| 5,917,477 | A | 6/1999 | Lee |
| 5,998,808 | A | 12/1999 | Matsushita |
| 6,212,550 | B1 | 4/2001 | Segur |
| 7,003,583 | B2 * | 2/2006 | Cho et al. ...................... 709/245 |
| 7,050,834 | B2 | 5/2006 | Harwood et al. |
| 2001/0019877 | A1 * | 9/2001 | Miyake et al. ................ 438/481 |
| 2002/0075249 | A1 | 6/2002 | Kubota et al. |
| 2002/0191757 | A1 * | 12/2002 | Belrose ..................... 379/88.13 |
| 2003/0052873 | A1 * | 3/2003 | Ueda ............................ 345/211 |
| 2003/0183876 | A1 | 10/2003 | Takafuji |
| 2005/0105747 | A1 | 5/2005 | Miyata et al. |

FOREIGN PATENT DOCUMENTS

| EP | 1 475 988 A1 | 11/2004 |
| EP | 1475988 A1 * | 11/2004 |
| JP | 62-201850 U | 12/1987 |

(Continued)

OTHER PUBLICATIONS

Official Communication issued in International Patent Application No. PCT/JP2004/019573, mailed on Feb. 8, 2005.

(Continued)

*Primary Examiner* — Amare Mengistu
*Assistant Examiner* — Jennifer Zubajlo
(74) *Attorney, Agent, or Firm* — Keating & Bennett, LLP

(57) ABSTRACT

In a display apparatus, a text code input section outputs externally-supplied text code information to a font conversion section and a voice synthesizer section. The font conversion section converts the input text code into a corresponding font, and transmits the font to a display drive section via a video signal input section, and the display drive section causes a display section to display the font. Meanwhile, the voice synthesizer section converts the input text code into corresponding voice data, and transmits the voice data to a voice device where the voice data is outputted. With this structure, superior convenience is ensured for a display apparatus which serves only as an individual displaying apparatus and relies on an external device (server) for the major functions of the system.

9 Claims, 9 Drawing Sheets

FOREIGN PATENT DOCUMENTS

| | | |
|---|---|---|
| JP | 02-165324 A | 6/1990 |
| JP | 04-024885 A | 1/1992 |
| JP | 5-100645 A | 4/1993 |
| JP | 09-051511 A | 2/1997 |
| JP | 10-333667 A | 12/1998 |
| JP | 11-17107 A | 1/1999 |
| JP | 11-331407 A | 11/1999 |
| JP | 11-352950 A | 12/1999 |
| JP | 2000-187470 A | 7/2000 |
| JP | 2001-125559 A | 5/2001 |
| JP | 2002-32048 A | 1/2002 |
| JP | 2003-078117 A | 3/2003 |
| JP | 2003-108079 A | 4/2003 |
| JP | 2003-244784 A | 8/2003 |
| JP | 2003-282885 A | 10/2003 |
| TW | M 240626 U | 8/2004 |

OTHER PUBLICATIONS

Ri et al.; "Forming a 3MHz-Operated MPU on a Glass Substrate"; Nikkei Electronics; Feb. 17, 2003; pp. 123-130.

Miyata; "Display Apparatus"; U.S. Appl. No. 10/597,201; filed Jul. 14, 2004.

* cited by examiner

DISPLAY APPARATUS

BACKGROUND OF THE INVENTION

1. Field of the Invention

The present invention relates to a display apparatus for displaying text or images based on text code information constituted of text codes or video signals, particularly to a client display apparatus operating under an external host apparatus.

2. Description of the Related Art

A display apparatus is normally used for displaying text based on text code information or for displaying an image based on a video signal. A conventional display apparatus generally also includes functions of major image processing by which the various processings required for displaying text or images according to text code information/video signal are performed.

Further, display apparatuses are often mounted to other kind of apparatuses. For example, Document 1 (Japanese Unexamined Patent Publication Jitsukaisho 62-201850/1987 (published on Dec. 23, 1987)) discloses a document processing device which displays text information supplied from a keyboard in a display section, and also outputs the text information as voice message by converting the text information into sound information. Further, Document 2 (Japanese Unexamined Patent Publication Tokukaihei 02-165324/1990 (published on Jun. 26, 1990)) discloses a document reader device which interprets document data and displays the data in a display section as an image and also outputs the same data as voice information. Further, Document 3 (Japanese Unexamined Patent Publication Tokukaihei 04-24885/1992 (published on Jan. 28, 1992)) discloses a reading processor device which takes out a text portion from an image and converts the text portion into a text code, which code is then converted into voice information by a voice synthesizer section, so as to output the text information as voice information.

The apparatuses disclosed in Documents 1 through 3 are all capable of outputting voice with their built-in image processing functions which carry out a process for converting text information into voice information.

Meanwhile, a small, light-weighted and thin display apparatus has been available in the market recently, which often serves as a mobile apparatus with a function of capturing an image from an external apparatus. Further, there is a demand for downsizing such a mobile apparatus into a card-size apparatus almost as small as a general credit card, name card etc. Prior to the present invention, the applicant of the present invention suggested in Document 4 (Japanese Unexamined Patent Publication Tokukai 2003-244784 (published on Aug. 29, 2003)) a card-sized display apparatus with voice output function. The apparatus produces sound by vibration of substrate constituting the display element, based on a voice signal supplied from an external apparatus. The display apparatus thus realizes a speaker function without increasing the apparatus size.

With the recent development of network infrastructure or various services, a recent demand for a display apparatus is not only mobility but also a wider range of application and a wider communication area, which can be achieved by relying on an external host device (server) for the most functions of the system. In this case the display apparatus is called a client or a thin client, and simply serves as a displaying device. With this arrangement, the display apparatus does not necessarily have to have a built-in function for general image processing.

The described invention of the same applicant for realizing a card-sized display apparatus with voice output function was made in view of this objective. Such a structure contributes to create a display apparatus with great mobility.

Then, the next object to be achieved is provision of various functions to such a display apparatus serving as a client device. The present invention is made in view of this object.

SUMMARY OF THE INVENTION

The applicant of the present invention had an intensive study on the various functions for a display apparatus serving as a client device, and invented a structure in which the display apparatus is provided with a function of recognizing text (characters) and a function of outputting the text information as voice information. This structure allows to the user to aurally confirm text messages, which were conventionally only visually confirmed. This offers a great convenience, which, for example, enables vision-impaired users to use the display apparatus.

A first display apparatus according to the present invention comprises: a display section; a voice output section; a text code input section for receiving an input text code externally supplied; a display control section for displaying text corresponding to the text code in the display section; and a voice output control section for outputting voice corresponding to the text code through the voice output section, the voice input section outputs the text code to the display control section and the voice output control section so as to display the text corresponding to the text code in the display section, and output the voice corresponding to the text code through the voice output section.

With this invention, the text code input section outputs the input text code to the display control section and the voice output control section so that the display control section causes the display section to display text corresponding to the input text code and the voice output control section causes the voice output section to output voice corresponding to the input text code, that is, voice reading the displayed text.

With this function, the user sees the display of the text message and also hears speaking voice corresponding to the text message even when only the text code is transmitted from an external apparatus. Consequently, the text information is displayed in the display section, and also is outputted as voice from the voice output section. This allows the user to both visually and aurally confirmed the text. Conventionally, vision-impaired users have not been able to confirm information transmitted from external apparatuses unless the external apparatus outputs a voice signal together with the text code information. On the other hand, the foregoing function allows such users to aurally confirm the content of text code information supplied from an external device even when the external device supplies only text code information. On this account, a wider range of information can be obtained from various external apparatuses.

Such a highly-convenient display apparatus is realized entirely in the display apparatus; that is, no modification is necessary for the external apparatus which outputs the text code information. Therefore, the foregoing effect is ensured for any conventional external apparatus having a function of outputting text codes. The present invention is thus highly versatile.

With this function, the user can aurally confirm the text message according to the externally supplied text code, in addition to the conventional visual confirmation of the text. Besides, this function is realized with no modification of the external device from which the text information is supplied.

This allows the user to both visually and aurally confirmed the text. With this advantage, the display apparatus is highly versatile and convenient.

A second display apparatus according to the present invention comprises: a display section; a voice output section; a video signal input section for receiving an input video signal externally supplied; a display control section for displaying an image based on the input video signal in the display section; a text recognizing section for extracting a text portion from the input video signal and converting the text portion into a text code; and a voice output control section for outputting voice corresponding to the text code through the voice output section, the video signal input section outputs the input video signal to the display control section and the text recognizing section, and the text recognizing section outputs the text code to the voice output control section, so that an image corresponding to the input video signal is displayed in the display section, and voice corresponding to the text code, which is included in the input video signal and is recognized by the text recognizing section, is outputted from the voice output section.

With this invention, the video signal input section outputs the externally supplied video signal to the display control section and the text recognizing section. The text recognizing section extracts the text portion contained in the video signal and converts the text portion into a text code. Consequently, the display control section causes the display section to display an image corresponding to the video signal and the voice output control section causes the voice output section to output voice corresponding to the text code, that is, voice reading the text contained in the displayed image.

With this function, the user sees the display of the image of the video signal and also hears speaking voice corresponding to the text portion contained in the video signal even when only the video signal is transmitted from an external apparatus. This allows the user to both visually and aurally confirmed the externally supplied data. Conventionally, vision-impaired users have not been able to confirm text information contained in a video signal transmitted from external apparatuses unless the external apparatus outputs a voice signal together with the text code information. On the other hand, the foregoing function allows, even when the external device supplies only a video signal, such users to aurally confirm the content of text information contained in the video signal. On this account, a wider range of information can be obtained from various external apparatuses.

Such a highly-convenient display apparatus is realized entirely in the display apparatus; that is, no modification is necessary for the external apparatus which outputs the video signals. Therefore, the foregoing effect is ensured for any conventional external apparatus having a function of outputting video signals. The present invention is thus highly versatile.

With this function, in addition to the conventional visual confirmation of the image, the user can aurally confirm a text message contained in an externally-supplied video signal, that is, a text portion among the image expressed by the video signal. Besides, this function is realized with no modification of the external device from which the video signal is supplied. This allows the user to both visually and aurally confirmed the information. With this advantage, the display apparatus is highly versatile and convenient.

Additional objects, features, and strengths of the present invention will be made clear by the description below. Further, the advantages of the present invention will be evident from the following explanation in reference to the drawings.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

A first display apparatus according to the present invention is capable of displaying text based on text code information extracted from an external apparatus, and also outputting voice corresponding to the text code information. To realize this function, a text code input section of the display apparatus and a text code output section of the external apparatus where the text code information comes from are connected via a wired or wireless line.

A second display apparatus according to the present invention is capable of displaying an image based on a video signal extracted from an external apparatus, and, if the video signal contains text information, also outputting voice corresponding to the text information. To realize this function, a video signal input section of the display apparatus and a video signal output section of the external apparatus where the video signal comes from are connected via a wired or wireless line.

With reference to some figures, these first and second display apparatuses according to the present invention are specifically explained below.

First Embodiment

The following explains one embodiment of the present invention with reference to FIGS. 1 through 6.

Figure 2:
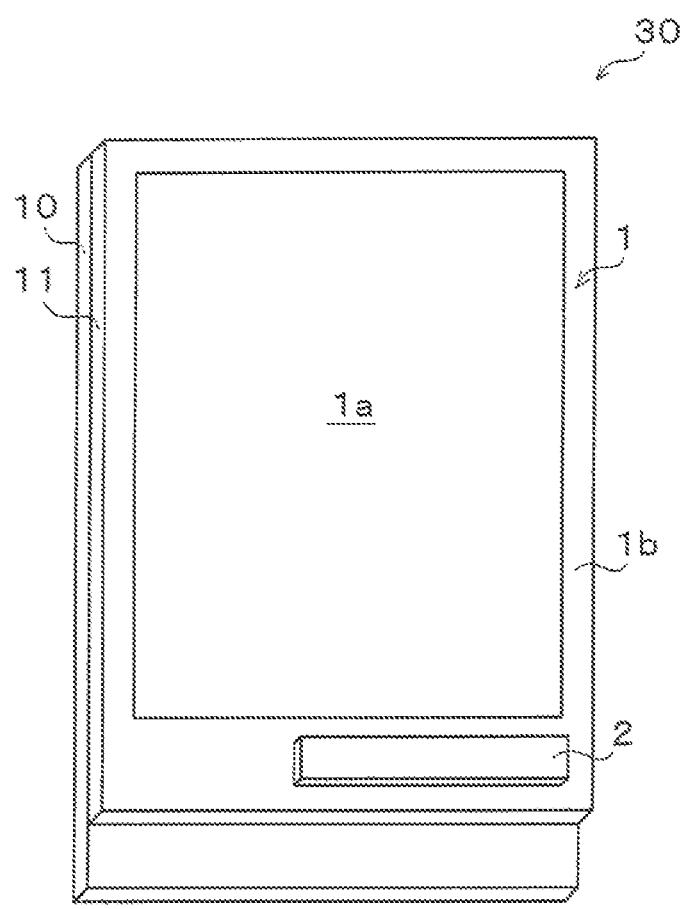
FIG. 2 is a perspective view showing a structure of the display apparatus of FIG. 1.
Figure 3:
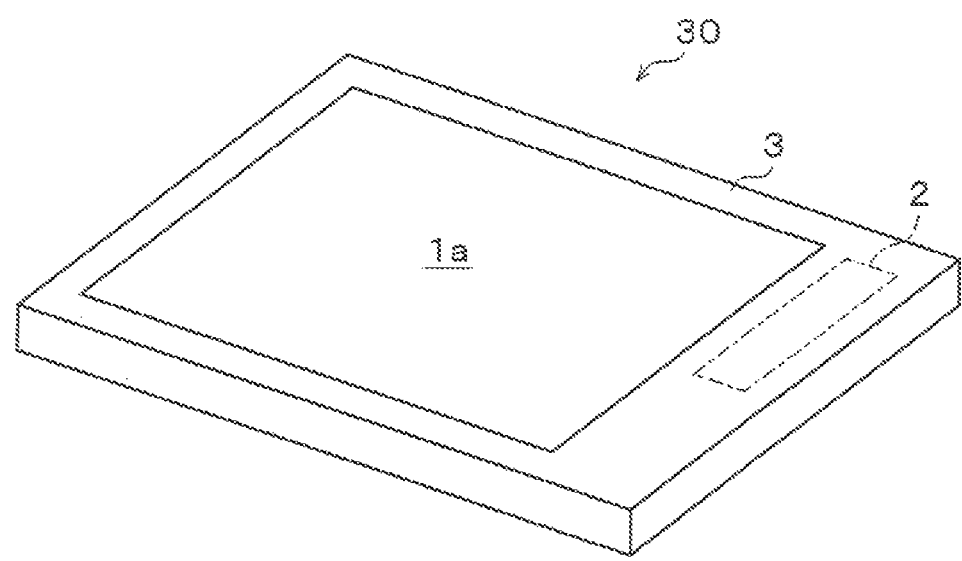
FIG. 3 is an exterior view of the display apparatus of FIG. 1.

First, with reference to FIGS. 2 and 3, the following explains the componential members of a display apparatus 30, which is the first embodiment of the present invention. FIG. 2 is a view showing the componential member of a display apparatus 30 according to the first embodiment of the present invention. FIG. 3 is an exterior view of the display apparatus 30.

As shown in FIG. 2, the display apparatus 30 includes a liquid crystal panel 1 and a voice device (voice output section, sound source element) 2. The liquid crystal panel 1 is made of a substrate on which the various sections (described in detail later) such as a display section drive section are monolithically formed. As such, the liquid crystal panel 1 is made as a display element including a built-in drive section.

The liquid crystal panel 1 displays in a display section 1a text information based on text code information supplied from an external apparatus connected to the display apparatus 30. The display apparatus 30 also displays in the display section 1a an image based on a video signal supplied from an external apparatus connected to the display apparatus 30. However, image display is not an indispensable function.

Further, the external apparatus from which the video signal is transmitted and the external apparatus from which the text code information is transmitted may be separate. There is no limitation in the present invention for connection state between the display apparatus 30 and the external apparatus, and combination of signals. These conditions are variable depending on the data format specified by the communication mode and/or the standards applied in the display apparatus 30, or the type of connection terminals. The present invention does not limit the modes or standards of communication or the type of terminals.

The liquid crystal panel 1 has a pair of transparent glass substrates 10 and 11, and liquid crystal held between the two substrates. The substrate 10, serving as a base substrate, has a thin film layer on a side opposite to another substrate 11. The thin film layer includes a polysilicon thin film. The substrate 10 has some thin film elements formed from the thin film layer, such as a pixel drive TFT (Thin Film Transistor) which is provided in the display section 1a. The display section drive section is also formed on the substrate 10. The substrate 10 is hereinafter referred to as a thin film substrate 10. On the other hand, the substrate 11 has a common electrode formed from a transparent conductive film such as an ITO on a side opposite to the substrate 10. The substrate 11 is hereinafter referred to as a counter substrate.

The voice device 2 may be constituted of a piezoelectric element made of a Rochelle salt crystal, a ceramic thin plate or the like, or a general voice coil speaker. The voice device 2 generates sound by vibrating the liquid crystal panel 1.

As shown in FIG. 3, the liquid crystal panel 1 and the voice device 2 are contained in a bezel 3 which covers the entire rear surface of the liquid crystal panel 1, and has an opening corresponding to the location of the display section 1a where various display operations are carried out.

The voice device 2 is located to be a part of the periphery section 1b surrounding the display section 1a of the liquid crystal panel 1. The periphery section 1b corresponds to the frame section of the display apparatus 30. Since the voice device 2 is provided on the periphery, it is not necessary to enlarge the frame section. As long as it is positioned on the periphery, the voice device 2 may be fixed onto the liquid crystal panel 1, or may be fixed onto the bezel 3. The voice device 2 is provided either on the front surface or the rear surface of the periphery section 1b. Further, in the case of using a reflective liquid crystal panel, the voice device 2 may be provided on the rear surface of the liquid crystal panel 1, which is the back side of the display apparatus 30.

Figure 1:
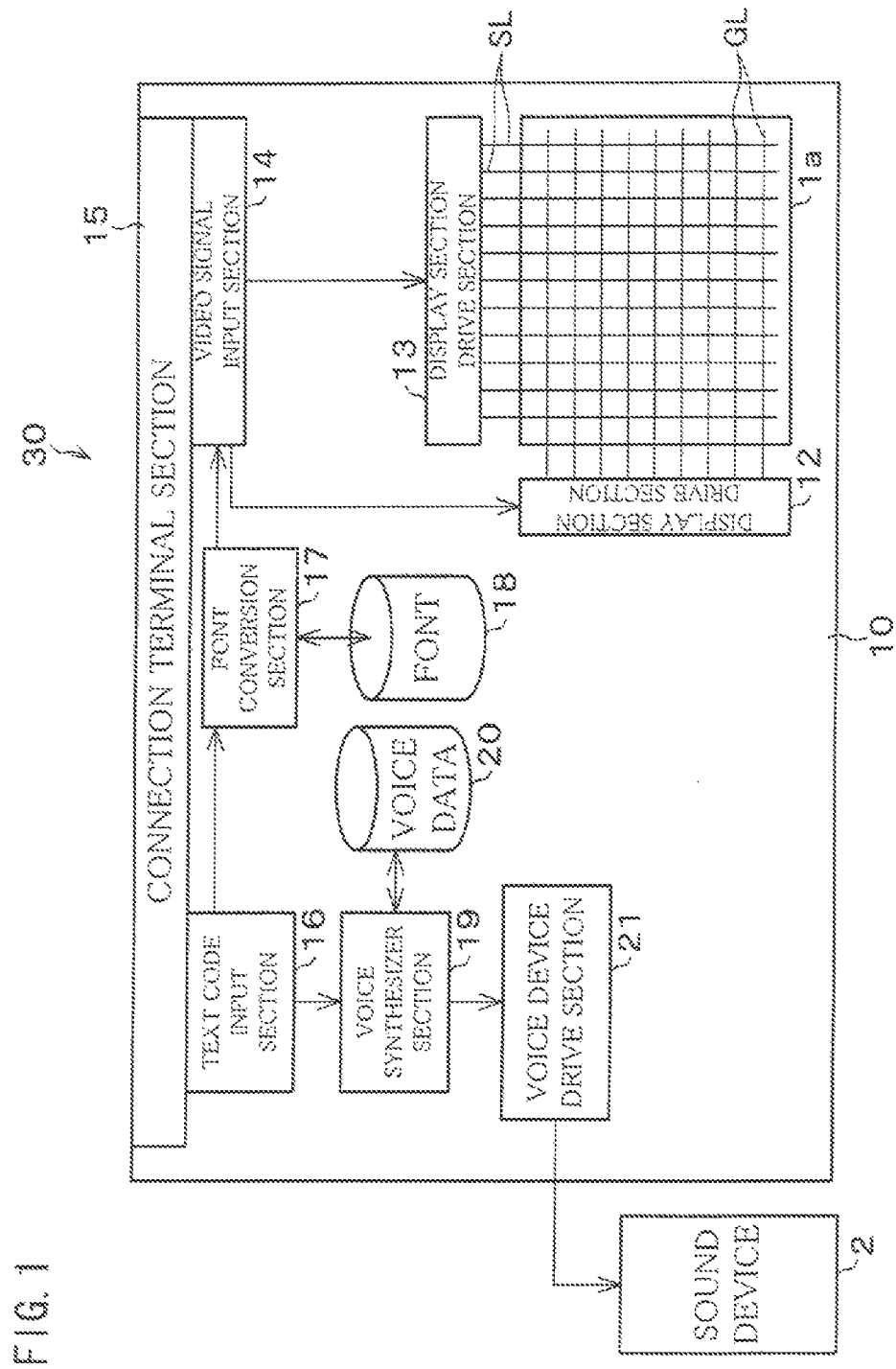
FIG. 1 is a functional block diagram of a display apparatus according to First Embodiment of the present invention.

FIG. 1 is a functional block diagram of the display apparatus 30. The display apparatus 30 includes, in terms of function, a display section 1a, display section drive sections (display section drive circuits) 12 and 13, a video signal input section 14, a text code input section 16, a font conversion section 17, a font memory 18, a voice synthesizer section 19, a voice data memory 20, a voice device drive section 21, a connection terminal section 15 and a voice device 2.

The connection terminal 15 serves as a terminal to establish connection with an external apparatus. The video signal input section 14 receives input video signal from various external apparatuses. The video signal input section 14 receives the video signals and also the control signals.

The display section drive section (scanning line drive circuit) 12 serves to drive the plurality of scanning lines GL in the display section 1a. The display section drive section 12 is supplied with various control signals for driving the scanning lines, such as a gate clock, gate start pulse etc., via the video signal input section 14.

The display section drive section (signal line drive circuit) 13 drives a plurality of signal lines SL in the display section 1a. The display section drive section 13 is supplied video signals and various control signals for driving the signal lines, such as a source clock, source start pulse etc., via the video signal input section 14.

The video signal input section 14 is further supplied with font data from the font conversion section 17 (described later). Receiving the font data, the video signal input section 14 combines the font data with a video signal, and transmits the resulting data to the display section drive section 13.

The display section drive sections (display section drive circuits) 12 and 13 serve to process the video signals and the control signals supplied from the video signal input section 14 to drive the display section 1a. This allows the display section 1a to display text and images. When the display section drive sections (display section drive circuits) 12 and 13 supply a video signal and font data, the video signal input section 14 displays a main image based on the video signal, and superimposes the font data on the main image.

The text code input section 16 receives an input text code (eg. ASCII: American Standard Code for Information Interchange) from various external apparatuses. The text code input section 16 then transmits the text code to the font conversion section 17 and the voice synthesizer section 19. The font conversion section 17 searches for font data corresponding to the text data in the font memory, and transmits the font data to the video signal input section 14, so as to make the display section 1a to display the font corresponding to the input text code supplied from the text code input section 16.

The voice synthesizer section 19 searches for voice data corresponding to the input text data in the voice data memory, and transmits the voice data to the voice device drive section (sound source element drive section) 21, so as to make the voice device 2 to output the voice corresponding to the input text code supplied from the text code input section 16. The voice data memory 20 may be omitted if the voice synthesizer section 19 consists of a regulation synthesis using voice generating modeling. The voice device drive section 21 processes the voice data supplied from the voice device drive section 21 so as to drive the voice device 2.

In this embodiment, the display section drive sections (display section drive circuits) 12 and 13, the font conversion section 17, the font memory 18, and the video signal input section 14 constitute a display control section. The voice synthesizer section 19 and the voice data memory 20 constitute a voice output control section.

Figure 4:
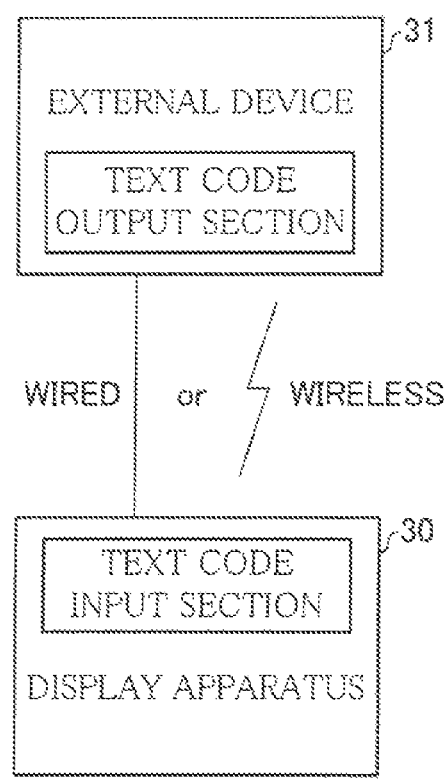
FIG. 4 is a drawing showing the whole system including the display apparatus of FIG. 1 and an external apparatus.

FIG. 4 is a drawing showing the whole system including the display apparatus 30 and an external apparatus. In the figure, the reference number 31 denotes an external apparatus which at least includes a text code output section. Typical examples of the external apparatus 31 includes keyboard, perforated media (tape, card) reading device, magnetic media reading device, optical media reading device (incl. disk media, multi-purpose scanner), Optical Character Reader (OCR), broadcast receiver, communication device (incl. business purpose radio device, stationary telephone, mobile phone), document editor, e-book information displaying device (incl. device dedicatedly used for dictionary search), and set-top box for internet broadcast communication. The external apparatus may be provided with an exclusive display apparatus which at least includes a text code output device having a text code output section.

The connection between the display apparatus 30 and the external apparatus 31 is established by conducting their connection terminals. If both of them are equipped with wireless communication functions which allow them to constitute a wireless system, they are connected in a wireless manner.

The following explains operation of the display apparatus 30 having such a structure. For example, a connection terminal of the display apparatus 30 is assumed to be connected to the external apparatus 31 having a text code output section. Text code information is supplied to the text code input section 16 from the text code output device, and the text code input section 16 carries out some processing of the data such as data shaping, and transmits the resulting data to the font conversion section 17 and the voice synthesizer section 19.

The font conversion section 17 converts the input text code into the font data, and transmits the font data to the video signal input section 14. The video signal input section 14 transmits the data to the display section drive sections 12 and 13. The display section drive sections 12 and 13 display text corresponding to the text code in the display section 1*a*. In the case where the display apparatus 30 is connected to a video signal output apparatus serving as the external apparatus 31 via the connection terminal section 15, and the video signal input section 14 is supplied with image signals, the video signal input section 14 combines the image of text with the image of the video signal, so that the text is superimposed on the image when it comes out in the screen.

Meanwhile, the voice synthesizer section 19 converts the input text code to corresponding voice data, and transmits the voice data to the voice device drive section 21. The voice device drive section 21 operates the voice device 2 so that the voice device 2 outputs voice corresponding to the input voice data.

For example, a text code "Good morning" is assumed to be outputted from the external apparatus as a result of the foregoing operation. The text code is then supplied to the text code input section 16. Consequently, the text "Good morning" is displayed in the display section 1*a*, and the voice device 2 outputs voice saying "Good morning" as if the displayed text is read out loud.

As described, the display apparatus 30 according to the present embodiment causes the display section 1*a* to display text corresponding to the text code supplied form the external apparatus 31, and also creates artificial voice based on the text code so that the displayed text is also outputted as voice. This function is performed entirely in the display apparatus 30; that is, no modification is necessary for the external apparatus.

With this function, the user sees the display of the text information and also hears speaking voice corresponding to the text message even when the external apparatus 31 supplies only text code information. This allows the user to both visually and aurally confirmed the text. With this advantage, the display apparatus 30 is highly convenient.

Conventionally, vision-impaired users have not been able to confirm information transmitted from the external apparatus 31 unless the external apparatus 31 outputs a voice signal together with the text code information. On the other hand, the foregoing function allows such users to aurally confirm the content of the output text code information, and therefore a wider range of information can be obtained from various external apparatuses. This function ensures high convenience of the display apparatus 30.

Further, such a convenience as a display apparatus can be attained with no modification of the external apparatus 31. The foregoing function is therefore ensured for any conventional external apparatus having a function of outputting text codes. The present invention is thus highly versatile.

In terms of this usage, the display apparatus 30 is preferably a mobile display apparatus, which is thin, light-weighted, and small-sized. On this account, the users can carry the display apparatus 30 with them, and can obtain data from external apparatus 31 by connecting the display apparatus to the text code output section of the external apparatus 31.

Further, the voice device drive section 21 is constituted of a semiconductor device or the like, and therefore cannot be fabricated with the components of the voice device 2 such as a piezoelectric element. Thus the voice device drive section 21 has to be formed on a separate substrate. However, if the voice device drive section 21 formed on a separate substrate is mounted to the voice device 2, the voice device is required to be enlarged, which brings about a difficulty in mounting the voice device 2 to the periphery section 1*b* of the display apparatus 30 while keeping the periphery section 1*b* in the same size. Besides, it also causes an increase in size of the display apparatus 30, decreasing versatility, mobility and convenience of the apparatus.

Since the effect of the present invention becomes particularly useful under condition where a conventional versatile information processing device provided with major image processing function cannot be operated, the voice device drive section 21 of the display apparatus 30 is formed on the thin substrate 10 in the liquid crystal panel 1. With such a layout, the voice device 2 can be formed small in thickness, size, and width, and is securely fitted in the frame section of the display apparatus 30. Further, since a separate substrate is not required, the cost is reduced, and also some defects such as removal of the junctions of plural separate circuit components, such as ICs, can be prevented.

Moreover, though this was not mentioned in the foregoing description, the all members of the display apparatus, which are shown in the functional block diagram of FIG. 1 except for the voice device 2; namely, the display section 1*a* (to be more specific, a pixel drive element, pixel electrode etc. of the display section 1 (circuit elements of the display section)), display section drive sections (display section drive circuits) 12 and 13, the video signal input section 14, the text code input section 16, the font conversion section 17, the font memory 18, the voice synthesizer section 19, the voice data memory 20, the voice device drive section 21, and the connection terminal section 15 are all formed on the thin film substrate 10 constituting the liquid crystal panel 1, together with the voice device drive section 21.

By thus forming the display section drive sections (display section drive circuits) 12 and 13, the voice synthesizer section 19 and the voice device drive section 21 each made of a thin film element, the font conversion section 17, and the font memories 18 and 20 on the thin film substrate 10 of the display section 1*a* of the liquid crystal panel on which the pixel drive circuit element is formed, the display apparatus 30 becomes capable of simultaneously displaying an image and outputting voice based on the text code without increasing the size.

Further, though it is not provided in the display apparatus 30, a voice signal input section may be provided to receive a voice signal coming from external apparatuses connected to the display apparatus 30 via the connection terminal section 15. In this case, the voice device 2 is vibrated by the voice device drive section 21 based on the voice signal supplied from the voice signal input section. With this structure, the voice device 2 becomes capable of outputting voice based on a voice signal supplied from an external apparatus, which allows the user to enjoy the sound accompanied by a video signal. The voice signal input section is also provided on the thin film substrate 10

Figure 5:
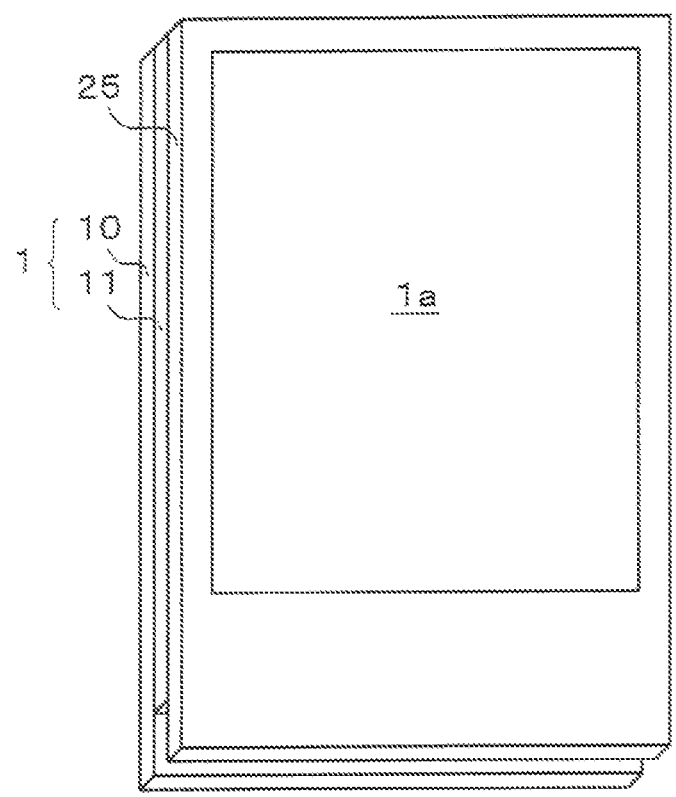
FIG. 5 is a perspective view showing a structure of a display apparatus according to modification example of First Embodiment of the present invention.
Figure 6:
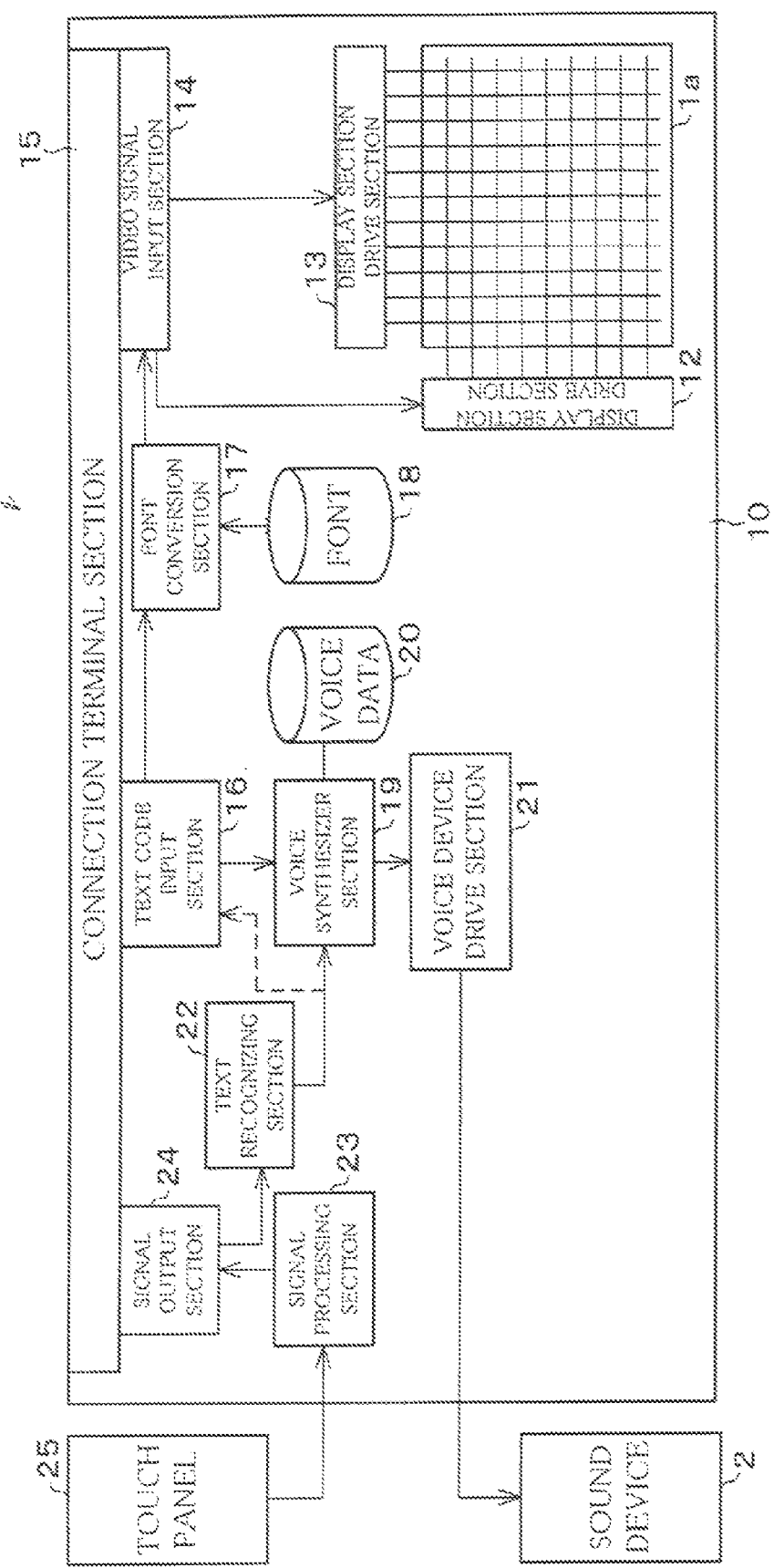
FIG. 6 is a functional block diagram of the display apparatus of FIG. 5.

The following explains a modification example of the display apparatus 30 with reference to FIGS. 5 and 6. FIG. 5 is a view showing a structure of a display apparatus 40 as a modification example. The display apparatus 40 additionally includes a touch panel. FIG. 6 is a functional block diagram of the display apparatus 40.

As shown in FIG. 5, the display apparatus 40 includes a touch panel 25 which causes a change in potential or in current in response to an action for pointing a specific portion by the user, and outputs a signal expressing the change. The touch panel 25 is layered on the front surface of the liquid crystal panel 1 within the plane region of the liquid crystal panel 1.

As it is obvious in comparison between the functional block diagram of FIG. 6 and the functional block diagram of FIG. 1, the modification example, that is, the display apparatus 40 also includes a signal processing section 23, a signal output section 24 and a text recognizing section 22, which are associated with the touch panel 25.

The signal processing section 23 serves to convert a signal supplied from the touch panel 25 into location information. The signal output section 24 transmits the location information coming from the signal processing section 23 to external apparatuses, and also transmits the location information to the text recognizing section 22.

When the user inputs hand-writing text information through the touch panel 25, the text information is transmitted to the text recognizing section 22 via the signal processing section 23 and the signal output section 24. The text recognizing section 22 recognizes the hand-writing text information using a method like pattern matching, and further converts the text into a text code. The text recognizing section 22 transmits the text code to the voice synthesizer section 19.

As described above, the voice synthesizer section 19 converts the text code into corresponding voice data, and transmits the resulting voice data to the voice device drive section 21 so that the voice device 2 is brought into operation. Consequently, the voice device 2 outputs voice of the text information as if the text displayed in the display section is read out loud.

More specifically, for example, if the user inputs hand-writing text information "Good morning" through the touch panel 25. The text code is then supplied to the text code input section 16. Consequently, the text "Good morning" is displayed in the display section 1a, and the voice device 2 outputs voice saying "Good morning" as if the displayed text is read out loud.

Further, the text code created in the text recognizing section 22 may also be supplied to the text code input section 16 so that the text code is also displayed in the display section 1a as the voice device 2 outputs the voice of the message. A most appropriate structure may be selected according to the assumed operation environment, and the standards used.

As explained, the foregoing modification example, that is, the display apparatus 40 is capable of outputting the voice corresponding to the hand-writing text inputted by the user through the touch panel 25. With this function, the users can aurally confirm whether their hand-writing texts are properly recognized by the apparatus. This offers all users a benefit of aural confirmation of their hand-writing inputs, not to mention the vision-impaired users. This modification thus further increases the convenience.

Note that, though the present embodiment is represented by the liquid crystal panel 1 using liquid crystal as a display element constituting the display section, the present invention is not limited to this structure. For example, the liquid crystal may instead be other display element driven by a thin film element formed from a thin film substrate. Examples of the display element includes an EL (Electro Luminescence) element; an element carrying out display by changing condition of reflection/diffusion of the incident light, which is usually performed by controlling the pixel section driven by a piezo-electric element or a micro machine; and an element using FED (Field Emission Display) mode.

Further, in the foregoing embodiment, the thin film substrate 10, which is contained in the display element, is a substrate having a thin film layer containing a polysilicon thin film, but the substrate 10 may instead be a glass substrate with a thin film layer containing a continuous grain boundary crystal silicon (CG silicon) thin film. Document 1 (Nikkei electronics (Feb. 17, 2003) p. 123-130) discloses a technique of forming a 8-bit micro processor on a glass substrate, and this document describes formation of a thin film layer containing CG silicon on a glass substrate by a continuous grain boundary crystal silicon technology. Compared to a general low temperature polysilison, CG silicon is constituted of larger grains, and their boundaries are digestedly aligned. Further, the high electron movement (200-300 $cm^2$/Vs) allows high-speed driving of the logic circuit. With this technique, a microprocessor can be formed on a substrate holding liquid crystal.

Further, the thin film substrate 10 may be constituted by combining a glass substrate having a thin film layer containing a polysilicon thin film with an active element for an integrated circuit made of monocrystal silicon. The bonding method for monocrystal silicon can be found in Document 5 (Japanese Laid-Open patent Publication Tokukaihei 11-17107 (published on Jan. 22, 1999).

Further, bonding of the thin film substrate 10 with an active element formed on a separate substrate is preferably performed by a hydrogen ion peeling method in which the substrate with the active element is provided with a hydrogen ion injecting section and is heated after bonded to the thin film substrate 10.

The thin film substrate 10 and the active element formed on the separate substrate may be bonded with an adhesive, but the bonding process is quite troublesome. Further, the adhesive is not always highly-heat resistant, and the process after the bonding is therefore limited. On the other hand, an adhesive is not required in the hydrogen ion peeling method, therefore the method is immune to such problems.

The following describes an example of hydrogen ion peeling method for bonding a MOS monocrystal silicon thin film transistor to an insulating substrate. The monocrystal silicon substrate has on its front surface an oxide film, a gate pattern, an impurity ion injection section, which constitute a part of the MOS monocrystal silicon thin film transistor, and also has a hydrogen ion injection section at a certain depth from the front surface. The MOS monocrystal silicon thin film transistor is combined with an insulating substrate at the oxide film, and is subjected to heat treatment. Consequently, the MOS monocrystal silicon thin film transistor and the insulating substrate are firmly bonded by atomic bond, and the heat treatment causes a cleavage in the hydrogen ion injection section. The unnecessary part is thus removed from the monocrystal silicon substrate. With this method, the MOS monocrystal silicon thin film transistor can be easily bonded to an insulating substrate without an adhesive.

Second Example

Figure 7:
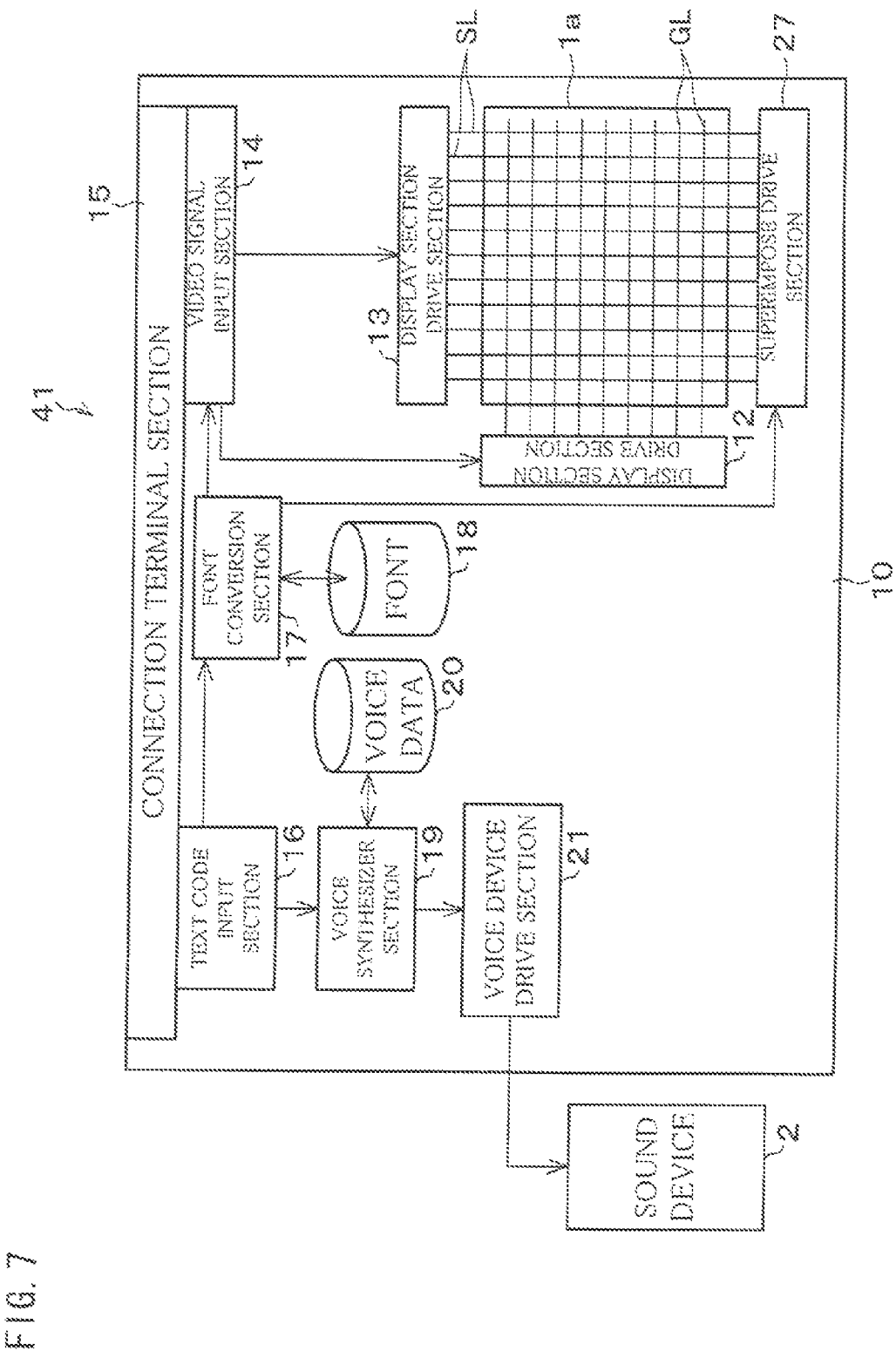
FIG. 7 is a functional block diagram according to Second Embodiment of the present invention.

The following explains another embodiment of the present invention with reference to FIG. 7. For ease of explanation, materials having the equivalent functions as those shown in the drawings pertaining to the foregoing First Embodiment will be given the same reference symbols, and explanation thereof will be omitted here.

The structure and the appearance of a display apparatus according to the present embodiment are shown in FIGS. 2 and 3, respectively. The display apparatus according to the present embodiment also includes a liquid crystal panel 1 as a display element and a voice device 2 as a sound source element 2. The voice device 2 is located in the periphery section 1b. The display apparatus according to the present embodiment is thus almost the same in structure as the display apparatus 30 according to First Embodiment. The present embodiment therefore describes only the functions not provided in the display apparatus 30 of First Embodiment.

FIG. 7 is a functional block diagram of the display apparatus 41. In the display apparatus 30 shown in FIG. 1, the font data supplied from the font conversion section 17 is transmitted to the video signal input section 14 in which the font data is synthesized with an image of the video signal to be transmitted to the display section drive section 13. On the other hand, as shown in FIG. 7, the display apparatus 41 according to the present embodiment includes a superimpose drive section 27 (second signal line drive circuit) which is provided oppositely to the display section drive section 13 (second signal line drive circuit) via the display section 1a. The font data is supplied to the superimpose drive section 27.

The superimpose drive section 27 serves to superimpose drawing data directly to the main image based on the video signal, which was supplied to the video signal input section 14, and has been written to the display section drive section 13 in the blanking period by the display section drive section 12. The superimpose drive section 27 is monolithically formed with the display section drive section 13 on the thin film substrate 10.

The plurality of signal lines SL of the display section 1a also constitutes the superimpose drive section 27. After the display section drive section 13 finishes driving the signal lines SL, the superimpose drive section 27 drives them again so as to superimpose the image of font data (font image) on the main image. Alternatively, a separate signal line drive circuit dedicatedly used for superimposing may be provided. The details of such a structure is described in Document 6 (Japanese Unexamined Patent Publication Tokukai 2000-187470 (published on Jul. 4, 2000)), Document 7 (Japanese Unexamined Patent Publication Tokukai 2003-108079 (published on Apr. 11, 2003)), and Document 8 (Japanese Unexamined Patent Publication Tokukai 2002-32048 (published on Jan. 31, 2002)).

This structure does not require a specific conversion circuit or a memory, and therefore solves complexity of the periphery circuit capable of simultaneous display of plural images. Accordingly, the number of additional circuit decreases. The display apparatus according to the present invention is thus smaller in size and thickness than the display apparatus of First Embodiment. The display apparatus of the present invention is therefore realized as a card device of a desired size.

Further, as with the modification example of First Embodiment, the display apparatus of the present embodiment may include a touch panel 25 attached to the thin film substrate 10 shown in the functional block diagram of FIG. 7. In this case, the thin film substrate 10 includes the signal processing section 23 and the signal output section 24, and the output signal of the signal output section 24 is supplied to the text recognizing section 22. With this structure, the hand-writing text inputted by the user through the touch panel 25 is displayed in the display section, and the voice corresponding to the hand-writing text is outputted from the voice device 2. The display apparatus is thus highly convenient. Note that, the display apparatus according to the present embodiment may be arranged so that the output signal of the signal output section 24 is supplied to the text recognizing section 22 and the superimpose drive section 27 at the same time.

Note that, the display element or the thin film substrate applicable in the present embodiment is the same as those of First Embodiment. The detailed explanation is therefore omitted here.

Third Embodiment

Figure 8:
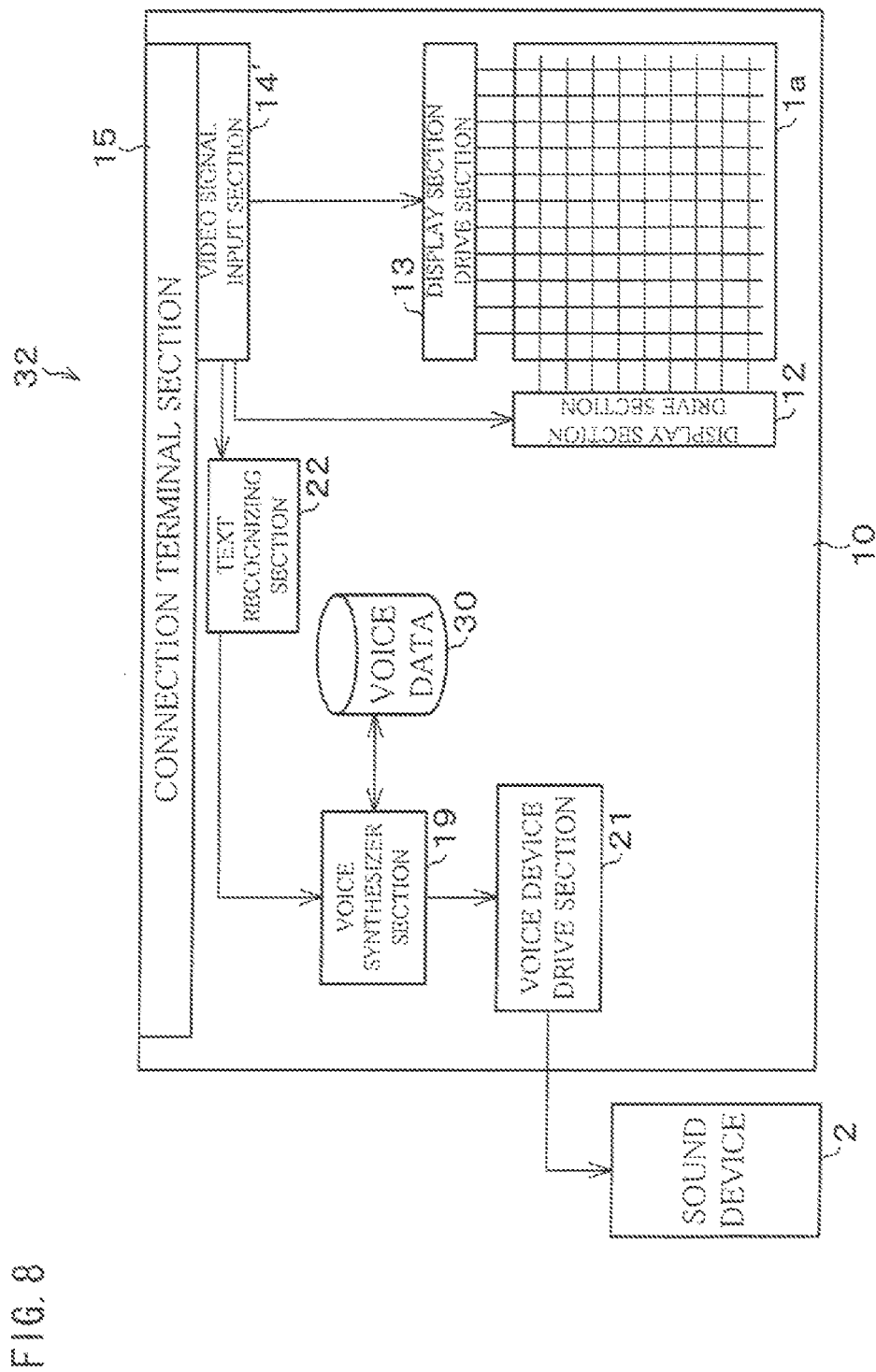
FIG. 8 is a functional block diagram according to Third Embodiment of the present invention.
Figure 9:
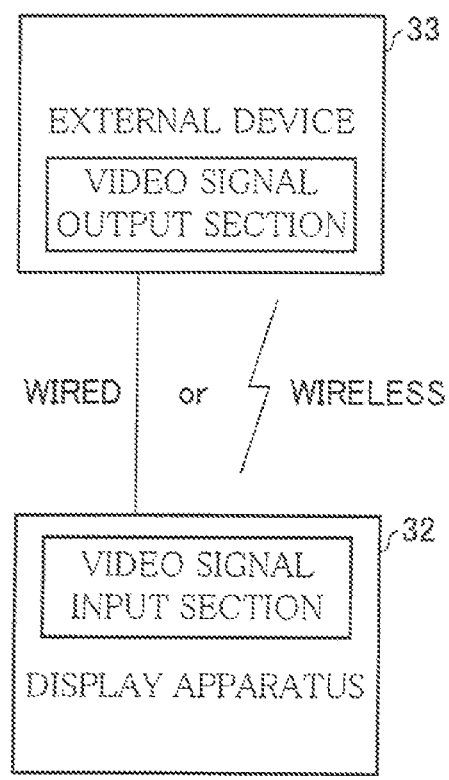
FIG. 9 is a drawing showing the whole system including the display apparatus of FIG. 8 and an external apparatus.

The following explains another embodiment of the present invention with reference to FIGS. 8 and 9. For ease of explanation, materials having the equivalent functions as those shown in the drawings pertaining to the foregoing First Embodiment will be given the same reference symbols, and explanation thereof will be omitted here.

The structure and the appearance of a display apparatus 32 according to the present embodiment are shown in FIGS. 2 and 3, respectively. The display apparatus according to the present embodiment also includes a liquid crystal panel 1 as a display element and a voice device 2 as a sound source element 2. The voice device 2 is located in the periphery section 1b. The display apparatus according to the present embodiment is thus almost the same in structure as the display apparatus 30 according to First Embodiment. The present embodiment therefore describes only the functions not provided in the display apparatus 30 of First Embodiment.

FIG. 8 is a functional block diagram of the display apparatus 32. The display apparatus 32 includes, in terms of function, a display section 1a, display section drive sections (display section drive circuits) 12 and 13, a video signal input section 14', a text recognizing section 22, a voice synthesizer section 19, a voice data memory 20, a voice device drive section 21, a connection terminal section 15 and a voice device 2. In other words, the display apparatus 32 is provided with the text recognizing section 22 instead of the text code input section 16, the font conversion section 17, and the font memory 18 of the display apparatus 30 of First Embodiment. Also, the signal input section 14 of First Embodiment is replaced with a signal input section 14'.

In this embodiment, the display section drive sections 12 and 13 and the video signal input section 14' constitute a display control section. The voice synthesizer section 19 and the voice data memory 20 constitute a voice output control section.

In the display apparatus 32, the signal input section 14' transmits the video signals (incl. control signals) supplied from various external apparatuses 33 (see FIG. 9) to the display section drive sections 12, 13 and the text recognizing section 22 via the connection terminal section 15. The display section drive sections 12 and 13 process the video signals supplied from the signal input section 14' and drives the display section 1a so that the display section 1a displays images based on the video signals.

Meanwhile, if the video signals supplied from the signal input section 14' include text information (any portion having a text shape), the text recognizing section 22 extracts the text information. The text recognizing section 22 then interprets the text information using a method like pattern matching, and further converts the text information into a text code. The text recognizing section 22 transmits the text code to the voice synthesizer section 19.

As described above, the voice synthesizer section 19 converts the text code into corresponding voice data, and transmits the resulting voice data to the voice device drive section 21 so that the voice device 2 is brought into operation. Consequently, the voice device 2 outputs voice of the text information as if the text displayed in the display section is read out loud.

More specifically, for example, if the video signals transmitted from an external apparatus include text information "Good morning", the text information is supplied to the signal input section 14'. Consequently, the text "Good morning" is displayed in the display section 1a together with an image based on the video signal, and the voice device 2 outputs voice saying "Good morning" as if the displayed text is read out loud.

FIG. 9 is a drawing showing the whole system including the display apparatus 32 and the external apparatus 33. Typical examples of the external apparatus 33 includes electro-photographic device, electronic image-capturing device, image storing media (tape, DVD etc.) reproducing device, broadcast receiver, communication device (incl. business purpose radio device, stationary telephone, mobile phone), information device with a video signal output section (eg. personal computer) e-book information displaying device (incl. device dedicatedly used for dictionary search), and set-top box for internet broadcast communication. The external apparatus may be provided with an exclusive display apparatus which at least includes a video signal output device having a video signal output section.

The connection between the display apparatus 32 and the external apparatus 33 is established by conducting their connection terminals. If both of them are equipped with wireless communication functions which allow them to constitute a wireless system, they are connected in a wireless manner.

As described, the display apparatus 32 according to the present embodiment causes the display section 1a to display text corresponding to the text code supplied form the external apparatus 33, and also extracts text information from the video signal so that the text in the displayed image is also outputted as voice. This function is performed entirely in the display apparatus 32; that is, no modification is necessary for the external apparatus 33.

With this function, the user sees the display of the image in the display section and also hears speaking voice corresponding to the text message contained in the video signal even when the external apparatus 33 supplies only the video signal. This allows the user to both visually and aurally confirmed the text. With this advantage, the display apparatus 32 is highly convenient.

Conventionally, vision-impaired users have not been able to confirm information transmitted from the external apparatus 33 unless the external apparatus 33 outputs voice corresponding to the text information contained in the image, together with the image of the video signal. On the other hand, the foregoing function allows such users to aurally confirm the content of the text information contained in the image, and therefore a wider range of information can be obtained from various external apparatuses. This function ensures high convenience of the display apparatus 32.

Further, such a convenience as a display apparatus can be attained with no modification of the external apparatus 33. The foregoing function is therefore ensured for any conventional external apparatus having a function of outputting video signals. The present invention is thus highly versatile.

In terms of this usage, the display apparatus 32 is preferably a mobile display apparatus, which is thin, light-weighted, and small-sized. On this account, the users can carry the display apparatus 32 with them, and can obtain data from external apparatus 33 by connecting the display apparatus 32 to the video signal output section of the external apparatus 33.

Moreover, though this was not mentioned in the foregoing description, the all members of the display apparatus, which are shown in the functional block diagram of FIG. 8 except for the voice device 2; namely, the display section 1a (to be more specific, a pixel drive element, pixel electrode etc. of the display section 1 (circuit elements of the display section)), display section drive sections (display section drive circuits) 12 and 13, the video signal input section 14, the text recognizing section 22, the voice synthesizer section 19, the voice data memory 20, the voice device drive section 21, and the connection terminal section 15 are all formed on the thin film substrate 10 constituting the liquid crystal panel 1, together with the voice device drive section 21.

By thus forming the display section drive sections (display section drive circuits) 12 and 13, the voice synthesizer section 19 and the voice device drive section 21 each made of a thin film element, the text recognizing section 22 on the thin film substrate 10 of the display section 1a of the liquid crystal panel on which the pixel drive circuit element is formed, the display apparatus 32 becomes capable of simultaneously displaying an image and outputting voice based on the text information contained in the image without increasing the size.

Further, though it is not provided in the display apparatus 32, a voice signal input section may be provided on the thin film substrate 10 to receive a voice signal coming from external apparatuses connected to the display apparatus 32 via the connection terminal section 15. In this case, the voice device 2 is vibrated by the voice device drive section 21 based on the voice signal supplied from the voice signal input section. With this structure, the voice device 2 becomes capable of outputting voice based on a voice signal supplied from an external apparatus, which allows the user to enjoy the sound accompanied by a video signal.

Further, as with the modification example of First Embodiment, the display apparatus 32 of the present embodiment may include a touch panel 25 attached to the thin film substrate 10 shown in the functional block diagram of FIG. 8. In this case, the thin film substrate 10 includes the signal processing section 23 and the signal output section 24, and the output signal of the signal output section 24 is supplied to the text recognizing section 22. With this structure, the hand-writing text inputted by the user through the touch panel 25 is displayed in the display section, and the voice corresponding to the hand-writing text is outputted from the voice device 2. The display apparatus is thus highly convenient. Note that, the display apparatus according to the present embodiment may be arranged so that the output signal of the signal output section 24 is supplied to the text recognizing section 22 and the signal input section 14' at the same time.

Note that, the display element or the thin film substrate applicable in the present embodiment is the same as those of First Embodiment. The detailed explanation is therefore omitted here.

The present invention is not limited to the description of the embodiments above, but may be altered by a skilled person within the scope of the claims. An embodiment based on a proper combination of technical means disclosed in different embodiments is encompassed in the technical scope of the present invention.

As described, a first display apparatus according to the present invention comprises: a display section; a voice output section; a text code input section for receiving an input text code externally supplied; a display control section for displaying text corresponding to the text code in the display section; and a voice output control section for outputting voice corresponding to the text code through the voice output section, the voice input section outputs the text code to the display control section and the voice output control section so as to display the text corresponding to the text code in the display section, and output the voice corresponding to the text code through the voice output section.

With this invention, the text code input section outputs the input text code to the display control section and the voice output control section so that the display control section causes the display section to display text corresponding to the input text code and the voice output control section causes the voice output section to output voice corresponding to the input text code, that is, voice reading the displayed text.

With this function, the user sees the display of the text message and also hears speaking voice corresponding to the text message even when only the text code is transmitted from an external apparatus. Consequently, the text information is displayed in the display section, and also is outputted as voice from the voice output section. This allows the user to both visually and aurally confirmed the text. Conventionally, vision-impaired users have not been able to confirm information transmitted from external apparatuses unless the external apparatus outputs a voice signal together with the text code information. On the other hand, the foregoing function allows such users to aurally confirm the content of text code information supplied from an external device even when the external device supplies only text code information. On this account, a wider range of information can be obtained from various external apparatuses.

Such a highly-convenient display apparatus is realized entirely in the display apparatus; that is, no modification is necessary for the external apparatus which outputs the text code information. Therefore, the foregoing effect is ensured for any conventional external apparatus having a function of outputting text codes. The present invention is thus highly versatile.

The first display apparatus according to the present invention may further comprises a video signal input section for receiving an input video signal externally supplied. In this case, the first display apparatus is arranged such that the display control section displays in the display section an image based on the input video signal supplied to the video signal input section, and displays the text corresponding to the text code so that the text is superimposed on the image.

With this invention, an image based on the video signal supplied through the video signal input section is displayed in the display section, and a text image corresponding to the text code is superimposed on the displayed image. Therefore, the user can enjoy the picture with the text, and the convenience of the display apparatus increases.

Further, when the text is superimposed on the image, the display section preferably has (i) a plurality of scanning lines arranged in line, and (ii) a plurality of signal lines arranged in line and respectively intersect with the scanning lines. In this case, the first display apparatus is arranged such that the display control section includes a (a) scanning line drive circuit which serves as a display section drive circuit for driving the display section by sequentially supplying scanning signals to the scanning lines, and a (b) signal line drive circuit for supplying video signals to the signal lines, the scanning line drive circuit being constituted of a first signal line drive circuit for receiving the video signal from the video signal input section and a second signal line drive circuit for receiving a video signal for displaying the text corresponding to the text code, the first signal line drive circuit and the second signal line drive circuit sharing the signal lines.

In the case of creating a single piece of image information by combining a picture of a video signal with a text image which corresponds to a text code generated inside the display apparatus so as to generate a video signal of a synthetic picture, which is outputted by the scanning line drive circuit to the signal line drive circuit to be displayed as a superimposed image, the display apparatus requires a memory with a large capacity, and an A/D conversion circuit or a D/A conversion circuit. This decreases the superior mobility of the display apparatus relying on the fact that the apparatus serves as a client apparatus using only a display function.

On the other hand, in the foregoing structure in which the scanning line drive circuit is constituted of a first signal line drive circuit for receiving the video signal from the video signal input section and a second signal line drive circuit for receiving a video signal for displaying the text corresponding to the text code, and the first signal line drive circuit and the second signal line drive circuit share the signal lines, it is not necessary to combine a picture of the externally-supplied video signal with a text image which corresponds to a text code generated inside the display apparatus so as to create a single piece of image information. Therefore, the display apparatus does not require the memory with a large capacity etc., and the number of additional circuits for superimposing display is reduced. On this account, the present invention does not decrease the superior mobility of the display apparatus relying on the fact that the apparatus serves as a client apparatus using only a display function.

A second display apparatus according to the present invention comprises: a display section; a voice output section; a video signal input section for receiving an input video signal externally supplied; a display control section for displaying an image based on the input video signal in the display section; a text recognizing section for extracting a text portion from the input video signal and converting the text portion into a text code; and a voice output control section for outputting voice corresponding to the text code through the voice output section, the video signal input section outputs the input video signal to the display control section and the text recognizing section, and the text recognizing section outputs the text code to the voice output control section, so that an image corresponding to the input video signal is displayed in the display section, and voice corresponding to the text code, which is included in the input video signal and is recognized by the text recognizing section, is outputted from the voice output section.

With this invention, the video signal input section outputs the externally supplied video signal to the display control section and the text recognizing section. The text recognizing section extracts the text portion contained in the video signal and converts the text portion into a text code. Consequently, the display control section causes the display section to display an image corresponding to the video signal and the voice output control section causes the voice output section to output voice corresponding to the text code, that is, voice reading the text contained in the displayed image.

With this function, the user sees the display of the image of the video signal and also hears speaking voice corresponding to the text portion contained in the video signal even when only the video signal is transmitted from an external apparatus. This allows the user to both visually and aurally confirmed the externally supplied data. Conventionally, vision-impaired users have not been able to confirm text information contained in a video signal transmitted from external apparatuses unless the external apparatus outputs a voice signal together with the text code information. On the other hand, the foregoing function allows, even when the external device supplies only a video signal, such users to aurally confirm the content of text information contained in the video signal. On this account, a wider range of information can be obtained from various external apparatuses.

Such a highly-convenient display apparatus is realized entirely in the display apparatus; that is, no modification is necessary for the external apparatus which outputs the video signals. Therefore, the foregoing effect is ensured for any conventional external apparatus having a function of outputting video signals. The present invention is thus highly versatile.

In addition to the foregoing arrangement, the first display apparatus of the present invention may be further arranged such that the display section is constituted of a display element drivable by a thin film element, and the text code input section, the display control section, and the voice output control section are either directly formed on a thin film substrate on which a pixel driving circuit element of the display element is formed, or are constituted of active elements formed on another substrate which is to be bonded to the thin film substrate. Further, in the case of providing a video signal input section, the video signal input section is also either directly formed on a thin film substrate on which a pixel driving circuit element of the display element is formed, or is constituted of active elements formed on another substrate which is to be bonded to the thin film substrate.

With this arrangement in which the text code input section, the display control section, and the voice output control section are either directly formed on a thin film substrate on which a pixel driving circuit element of the display element is formed, or are constituted of active elements formed on another substrate which is to be bonded to the thin film substrate, the display apparatus may be equipped with a voice output section without increasing in size, unlike the structure in which the respective sections, such as the display control section, the voice output control section etc., are formed on separate print substrates or the like. On this account, the display apparatus can be equipped with a text display function and a voice output function without increasing in size.

In addition to the foregoing arrangement, the second display apparatus of the present invention may be further arranged such that the display section is constituted of a display element drivable by a thin film element, and the video signal input section, the display control section, the text recognizing section, and the voice output control section are either directly formed on a thin film substrate on which a pixel driving circuit element of the display element is formed, or are constituted of active elements formed on another substrate which is to be bonded to the thin film substrate.

This arrangement also allows the display apparatus to be equipped with a voice output section without increasing in size, unlike the structure in which the respective sections, such as the display control section, the voice output control section etc., are formed on separate print substrates or the like. On this account, the display apparatus can be equipped with an image display function and a function of outputting voice of text information contained in the video signal, without increasing in size.

The another substrate having active elements preferably has a hydrogen ion injection section so that said another substrate is combined with the thin film substrate by adhering the hydrogen ion injection section to the thin film substrate and curing the hydrogen ion injection section by heating.

The thin film substrate 10 and the active element formed on the separate substrate may be bonded with an adhesive, but the bonding process is quite troublesome. Further, the adhesive is not always highly-heat resistant, and the process after the bonding is therefore limited. On the other hand, an adhesive is not required in the hydrogen ion peeling method, therefore the method is immune to such problems.

In addition to the foregoing arrangement, the first and second display apparatuses of the present invention may be further arranged such that the voice output section is constituted of a sound source element which is layered on the display element constituting the display section within a flat region of the display element, sound source element generating voice by vibrating the display element.

With this arrangement, the sound source element constituting the sound output section generates sound by vibrating the display element. Further, the sound source element drive section, which was conventionally formed on a separate substrate, is formed on the thin film substrate included in the display element. On this account, the sound source element can be reduced in size, and is layered on the display element constituting the display section within a flat region of the display element. In this way, The sound source element is mounted to the display element without significantly deteriorating the outer shape of the display apparatus having only a display function.

Also in this case, the another substrate having active elements preferably has a hydrogen ion injection section so that said another substrate is combined with the thin film substrate by adhering the hydrogen ion injection section to the thin film substrate and curing the hydrogen ion injection section by heating.

Further, in the first and second display apparatuses of the present invention, the thin film substrate includes a thin film layer including a polycrystal silicon thin film or a continuous grain boundary crystal silicon thin film. Further, in the first and second display apparatuses of the present invention, the display section performs display by liquid crystal or by an EL layer.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

The present invention is applicable to a display apparatus serving only as an individual displaying apparatus by relying on an external device (server) for the major functions of the system. Typical examples of the external apparatus for outputting text code information to the display apparatus includes perforated media (tape, card) reading device, magnetic media reading device, optical media reading device (incl. disk media, multi-purpose scanner), Optical Character Reader (OCR), broadcast receiver, communication device (incl. business purpose radio device, stationary telephone, mobile phone), document editor, e-book information displaying device (incl. device dedicatedly used for dictionary search), and set-top box for internet broadcast communication. The external apparatus may be provided with an exclusive display apparatus which at least includes a text code output device having a text code output section. Typical examples of the external apparatus for outputting video signals to the display apparatus includes electrophotographic device, electronic image-capturing device, image storing media (tape, DVD etc.) reproducing device, broadcast receiver, communication device (incl. business purpose radio device, stationary telephone, mobile phone), information device with a video signal output section (eg. personal computer) e-book information displaying device (incl. device dedicatedly used for dictionary search), and set-top box for internet broadcast communication.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A mobile display apparatus serving as a client device of an external host apparatus, the mobile display apparatus comprising:
    a display section;
    a voice output section;
    a video signal input section arranged to receive an input video signal from the external host apparatus;
    a display control section arranged to display in the display section an image based on the input video signal;
    a text recognizing section arranged to (i) extract a text image from an image corresponding to the input video signal and (ii) convert the text image into a text code; and
    a voice output control section arranged to output voice sounds corresponding to the text code through the voice output section; wherein
    the video signal input section outputs the input video signal supplied from the external host apparatus to the display control section and the text recognizing section;
    the text recognizing section converts the text image extracted from the image corresponding to the input video signal supplied from the video signal input section into a text code, and outputs the text code to the voice output control section so that the image corresponding to the input video signal is displayed in the display section; and
    the voice sounds corresponding to the text code are outputted from the voice output section.

2. The mobile display apparatus as set forth in claim 1, wherein:
    the display section includes a display element driven by a thin film element; and
    the video signal input section, the display control section, the text recognizing section, and the voice output control section are either directly provided on a thin film substrate on which a pixel driving circuit element of the display element is provided, or include active elements provided on another substrate which is bonded to the thin film substrate.

3. The mobile display apparatus as set forth in claim 2, wherein:
    the voice output section includes a sound source element which is layered on the display element of the display section within a flat region of the display element; and
    a sound source element generates voice sounds by vibrating the display element.

4. The mobile display apparatus as set forth in claim 3, wherein:
    the sound source element is driven by a sound source element drive section which is either directly provided on the thin film substrate, or includes active elements provided on another substrate which is bonded to the thin film substrate.

5. The mobile display apparatus as set forth in claim 2, wherein:
    the thin film substrate includes a thin film layer including a polycrystal silicon thin film.

6. The mobile display apparatus as set forth in claim 2, wherein:
    the thin film substrate includes a thin film layer including a continuous grain boundary crystal silicon thin film.

7. The mobile display apparatus as set forth in claim 2, wherein:
    the another substrate including the active elements has a hydrogen ion injection section; and
    the hydrogen ion injection section is adhered to the thin film substrate to combine said another substrate with the thin film substrate.

8. The mobile display apparatus as set forth in claim 1, wherein:
    the display section is a liquid crystal display.

9. The mobile display apparatus as set forth in claim 1, wherein:
    the display section includes an EL layer.

* * * * *